(12) United States Patent
Peng et al.

(10) Patent No.: US 8,956,587 B1
(45) Date of Patent: Feb. 17, 2015

(54) HYDROGEN PRODUCTION PROCESS WITH HIGH EXPORT STEAM

(71) Applicant: Air Products and Chemicals Inc., Allentown, PA (US)

(72) Inventors: Xiang-Dong Peng, Orefield, PA (US); David Anthony Zagnoli, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/061,377

(22) Filed: Oct. 23, 2013

(51) Int. Cl.
*C01B 3/24* (2006.01)
*C01B 3/26* (2006.01)

(52) U.S. Cl.
CPC ....................................... *C01B 3/26* (2013.01)
USPC .......................................................... 423/650

(58) Field of Classification Search
CPC ....................................................... C01B 3/34
See application file for complete search history.

(56) References Cited

U.S. PATENT DOCUMENTS

| | | | |
|---|---|---|---|
| 3,399,118 A | 3/1965 | Williamson | |
| 3,412,558 A | 11/1968 | Starmer | |
| 3,441,393 A | 4/1969 | Finneran et al. | |
| 3,479,820 A | 11/1969 | Rutenberg | |
| 3,597,328 A | 8/1971 | Michels | |
| 3,691,020 A | 9/1972 | Hughes | |
| 3,875,017 A | 4/1975 | Saari et al. | |
| 4,338,199 A | 7/1982 | Modell | |
| 5,421,962 A | 6/1995 | Shvarts et al. | |
| 5,441,548 A | 8/1995 | Brandl et al. | |
| 7,037,485 B1 | 5/2006 | Drnevich et al. | |
| 7,377,951 B2 | 5/2008 | Pham et al. | |
| 7,427,368 B2 | 9/2008 | Drnevich | |
| 7,988,948 B2 | 8/2011 | Guvelioglu et al. | |
| 8,387,545 B2 | 3/2013 | Latimer et al. | |
| 8,430,947 B2 | 4/2013 | Latimer et al. | |
| 8,496,908 B1 | 7/2013 | Genkin et al. | |
| 2004/0038089 A1 | 2/2004 | Hoffjann et al. | |
| 2007/0246345 A1 | 10/2007 | Leveson et al. | |
| 2009/0117024 A1 | 5/2009 | Weedon et al. | |
| 2009/0230359 A1* | 9/2009 | Guvelioglu et al. | .......... 252/373 |
| 2011/0147195 A1 | 6/2011 | Shapiro et al. | |
| 2011/0162952 A1 | 7/2011 | Conchieri et al. | |
| 2012/0055776 A1 | 3/2012 | Feher | |

FOREIGN PATENT DOCUMENTS

| | | |
|---|---|---|
| CA | 2190299 | 11/1996 |
| DE | 102 16 709 B4 | 4/2003 |
| EP | 0142214 | 5/1985 |
| EP | 0200825 A1 | 12/1986 |
| EP | 1921281 | 10/2007 |
| GB | 754745 | 8/1956 |
| GB | 2443802 | 5/2008 |
| GB | 2470874 A | 12/2010 |
| WO | 2004103896 | 12/2004 |
| WO | 2007149879 A2 | 12/2007 |

* cited by examiner

*Primary Examiner* — Melvin C Mayes
*Assistant Examiner* — Kenneth Vaden
(74) *Attorney, Agent, or Firm* — Bryan C. Hoke, Jr.

(57) ABSTRACT

A catalytic steam-hydrocarbon reforming process for producing a hydrogen-containing product and export steam where a first stream of make-up water is heated by flue gases from the reformer and a second stream of make-up water is heated by reformate from the reformer prior to being introduced into a deaerator.

17 Claims, 3 Drawing Sheets

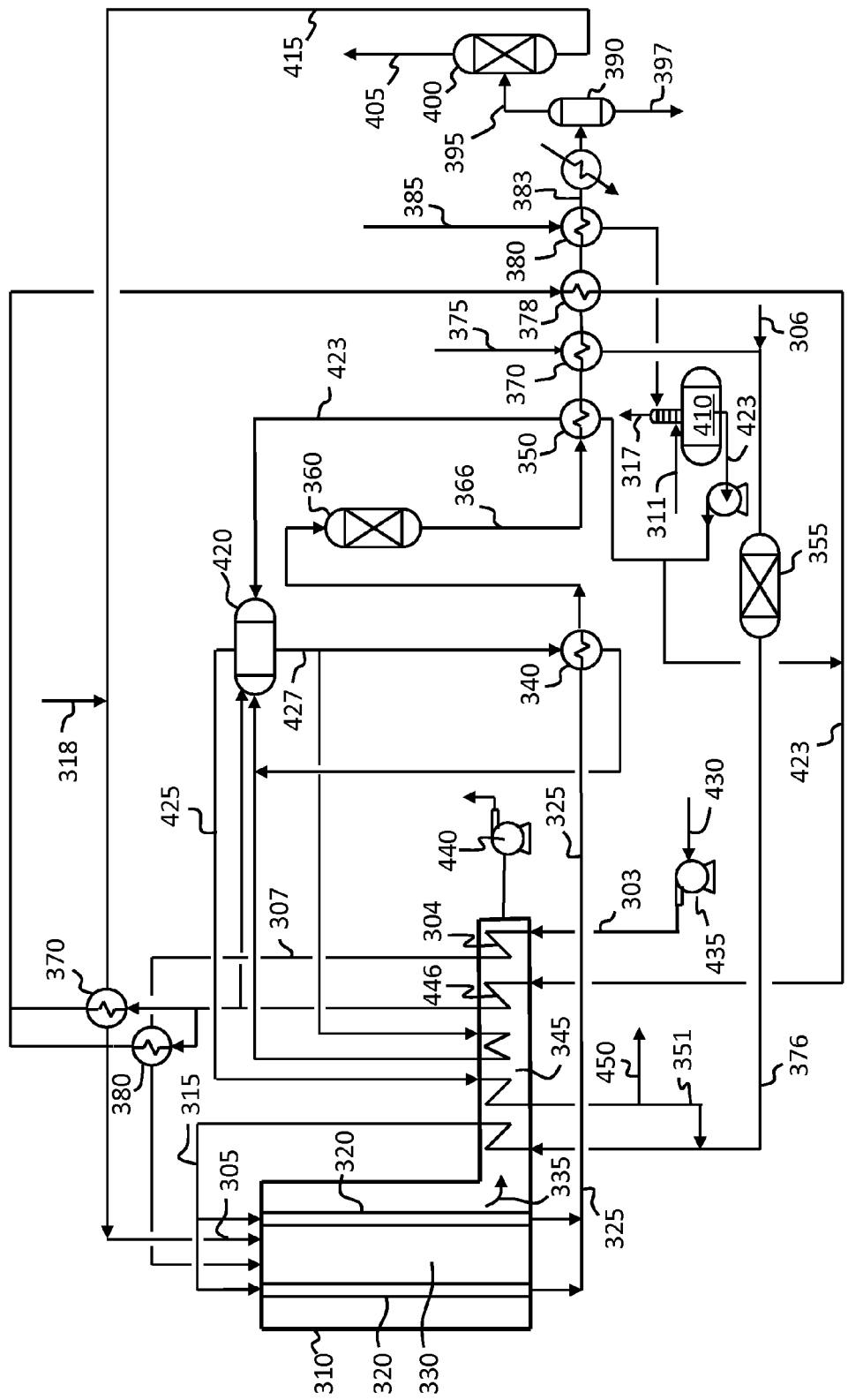
FIG. 3 (comparative example)

HYDROGEN PRODUCTION PROCESS WITH HIGH EXPORT STEAM

CROSS-REFERENCE TO RELATED APPLICATIONS

This patent application is related to U.S. patent application Ser. No. 14/061,428, titled "Integrated Process for the Production of Hydrogen and Water", filed contemporaneously with the present application.

BACKGROUND

Export steam is often produced from catalytic steam-hydrocarbon reforming processes to recover heat that would otherwise be discharged to the atmosphere and thereby wasted. However as the amount of export steam produced is increased beyond a threshold limit, the energy efficiency of the overall catalytic steam-hydrocarbon reforming process is degraded. As more export steam is produced, conventional steam-hydrocarbon reforming processes must combust more fuel and let down high level heat that would otherwise heat combustion air and other process streams for low level heating of water for making the export steam. This mismatch in heat source and heat sink results in combustion of additional fuel and increases the amount of combustion product gas (flue gas) formed and thereby increases the heat loss to the environment via the flue gas losses.

Industry desires to improve the energy efficiency of catalytic steam-hydrocarbon reforming processes when increasing the amount of export steam produced.

BRIEF SUMMARY

The present invention relates to a process for producing a hydrogen-containing product and a steam product. The present invention is particularly useful for producing increased quantities of export steam.

There are several aspects of the process as outlined below. In the following, specific aspects of process will be outlined. The reference numbers and expressions set in parentheses are referring to example embodiments explained further below with reference to the figures and are provided for the convenience of the reader. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A process for producing a hydrogen-containing product (105) and a steam product (150), the process comprising:
(a) introducing a reformer feed gas mixture (15) into a plurality of catalyst-containing reformer tubes (20) in a reformer furnace (10), reacting the reformer feed gas mixture (15) in a reforming reaction under reaction conditions effective to form a reformate (25) comprising $H_2$, CO, $CH_4$, and $H_2O$, and withdrawing the reformate (25) from the plurality of catalyst-containing tubes (20);
(b) combusting a fuel (5) with a heated oxidant gas (7) in a combustion section (30) of the reformer furnace (10) external to the plurality of catalyst-containing reformer tubes (20) under conditions effective to combust the fuel (5) to form a combustion product gas (35) and generate heat to supply energy for reacting the reformer feed gas mixture (15) inside the plurality of catalyst-containing reformer tubes (20), and withdrawing the combustion product gas (35) from the combustion section (30);
(c) heating an oxidant gas (3) by indirect heat transfer with the combustion product gas (35) from the combustion section (30) thereby forming the heated oxidant gas (7) and cooling the combustion product gas;
(d) heating a first water feed stream (87) by indirect heat transfer with the combustion product gas (35) thereby further cooling the combustion product gas, wherein heat is extracted from the combustion product gas to heat the oxidant gas (3) prior to extracting heat from the combustion product gas to heat the first water feed stream (87);
(e) heating a second water feed stream (85) by indirect heat transfer with the reformate (25) withdrawn from the plurality of catalyst-containing tubes (20);
(f) passing the first water feed stream (87) and the second water feed stream (85) to a deaerator (110), the first water feed stream being passed to the deaerator (110) after being heated by the combustion product gas, the second water feed stream being passed to the deaerator (110) after being heated by the reformate (25), stripping dissolved gases from the first water feed stream (87) and from the second water feed stream (85) in the deaerator (110), withdrawing a vent stream (17) from the deaerator (110), the vent stream (17) comprising steam and gases formed from the dissolved gases stripped from the first water feed stream (87) and from the second water feed stream (85), and withdrawing a boiler feed water stream (123) from the deaerator (110), the boiler feed water stream (123) comprising at least a portion of the first water feed stream (87) and at least a portion of the second water feed stream (85);
(g) forming the hydrogen-containing product (105) from the reformate (25) after the reformate (25) has heated the second water feed stream (85); and
(h) forming the steam product (150) from at least a portion of the boiler feed water stream 123 withdrawn from the deaerator (110).

Aspect 2. The process of aspect 1 wherein the hydrogen-containing product (105) has a mass flow rate, $m_{H_2}$, the steam product (150) exported from the process has a mass flow rate, $M_{steam}$, the reformer feed gas mixture (15) has a reformer feed gas mixture mass flow rate, the first water feed stream (87) has a first feed water feed stream mass flow rate, the second water feed stream (85) has a second water feed stream mass flow rate, the fuel (5) has a fuel mass flow rate, the oxidant gas (3) has an oxidant gas mass flow rate, and wherein the reformer feed gas mixture mass flow rate, the first water feed stream mass flow rate, the second water feed stream mass flow rate, the fuel mass flow rate, and the oxidant gas mass flow rate are such that $$12 \le \frac{m_{steam}}{m_{H_2}} \le 25.$$

Aspect 3. The process of aspect 1 or aspect 2 wherein the step of heating the oxidant gas (3) by indirect heat transfer with the combustion product gas (35) comprises:
(c1) heating a first boiler feed water stream (124) by indirect heat transfer with the combustion product gas (35);
(c2) passing at least a portion of the first boiler feed water stream (124) from step (c1) to a first heat exchanger (180); and (c3) heating the oxidant gas (3) by indirect heat transfer with the at least a portion of the first boiler feed water stream (124) in the first heat exchanger (180).

Aspect 4. The process of aspect 3 further comprising:
passing the at least a portion of the first boiler feed water stream (124) from the first heat exchanger (180) to a third heat exchanger (78); and
heating the at least a portion of the first boiler feed water stream by indirect heat transfer with the reformate (25) in the third heat exchanger (78).

Aspect 5. The process of aspect 3 or aspect 4 further comprising:
passing at least another portion of the first boiler feed water stream (124) from step (c1) to a second heat exchanger (170); and
heating at least a portion of the fuel 5 by indirect heat transfer with the at least another portion of the first boiler feed water stream (124) in the second heat exchanger (170).

Aspect 6. The process of aspect 5 further comprising:
passing the at least another portion of the boiler feed water stream (124) from the second heat exchanger (170) to a third heat exchanger (78); and
heating the at least another portion of the boiler feed water stream (124) by indirect heat transfer with the reformate (25) in the third heat exchanger (78).

Aspect 7. The process of any one of aspects 3 to 6 further comprising:
introducing a portion of the first boiler feed water stream (124) from step (c1) into a steam drum (120).

Aspect 8. The process of any one of aspects 3 to 7 wherein the first boiler feed water stream (124) heated in step (c1) is formed from a portion of the boiler feed water stream (123) withdrawn from the deaerator (110) and at least one of the at least a portion of the first boiler feed water stream from the third heat exchanger (78), and the at least another portion of the first boiler feed water stream from the third heat exchanger (78).

Aspect 9. The process of any one of aspects aspect 1 to 8 wherein the oxidant gas (3) is additionally heated by indirect heat transfer with the reformate (25).

Aspect 10. The process of any one of aspects 1 to 9 wherein the oxidant gas (3) is heated by to a temperature ranging from 100° C. to 260° C.

Aspect 11. The process of any one of aspects 1 to 10 wherein the first water feed stream (87) is heated by the combustion product gas (35) in step (d) to a temperature ranging from 65° C. to 125° C.

Aspect 12. The process of any one of aspects 1 to 11 wherein the combustion product gas is cooled to a temperature ranging from 50° C. to 125° C. or from 55° C. to 95° C. as a result of heating the first water feed stream.

Aspect 13. The process of any one of aspects 1 to 12 wherein the second water feed stream (85) is heated by the reformate (25) in step (e) to a temperature ranging from 65° C. to 125° C.

Aspect 14. The process of any one of aspects 1 to 13 wherein the step of forming the hydrogen-containing product (105) comprises separating at least a portion of the reformate by pressure swing adsorption to produce the hydrogen-containing product (105) and a by-product gas (115).

Aspect 15. The process of aspect 14 wherein the fuel (5) comprises the by-product gas (115) and a supplemental fuel (119; 118).

Aspect 16. The process of aspect 15 further comprising introducing a hydrocarbon feedstock (75; 117) into a hydrodesulphurization unit (155; 165) to remove sulfur from the hydrocarbon feedstock, and forming the supplemental fuel (119; 118) from at least a portion of said hydrocarbon feedstock obtained from the hydrodesulphurization unit.

Aspect 17. The process of any one of aspects 14 to 16 wherein the by-product gas (115) is heated by indirect heat transfer with the combustion product gas (35) and/or the reformate (25) to a temperature ranging from 100° C. to 260° C.

Aspect 18. The process of any preceeding claim wherein at least a portion of the fuel is heated by indirect heat transfer with the combustion product gas and/or the reformate to a temperature ranging from 100° C. to 260° C.

BRIEF DESCRIPTION OF SEVERAL VIEWS OF THE DRAWINGS

FIG. 3 is a process flow diagram for a comparative steam-hydrocarbon reforming process.

DETAILED DESCRIPTION

Figure 1:
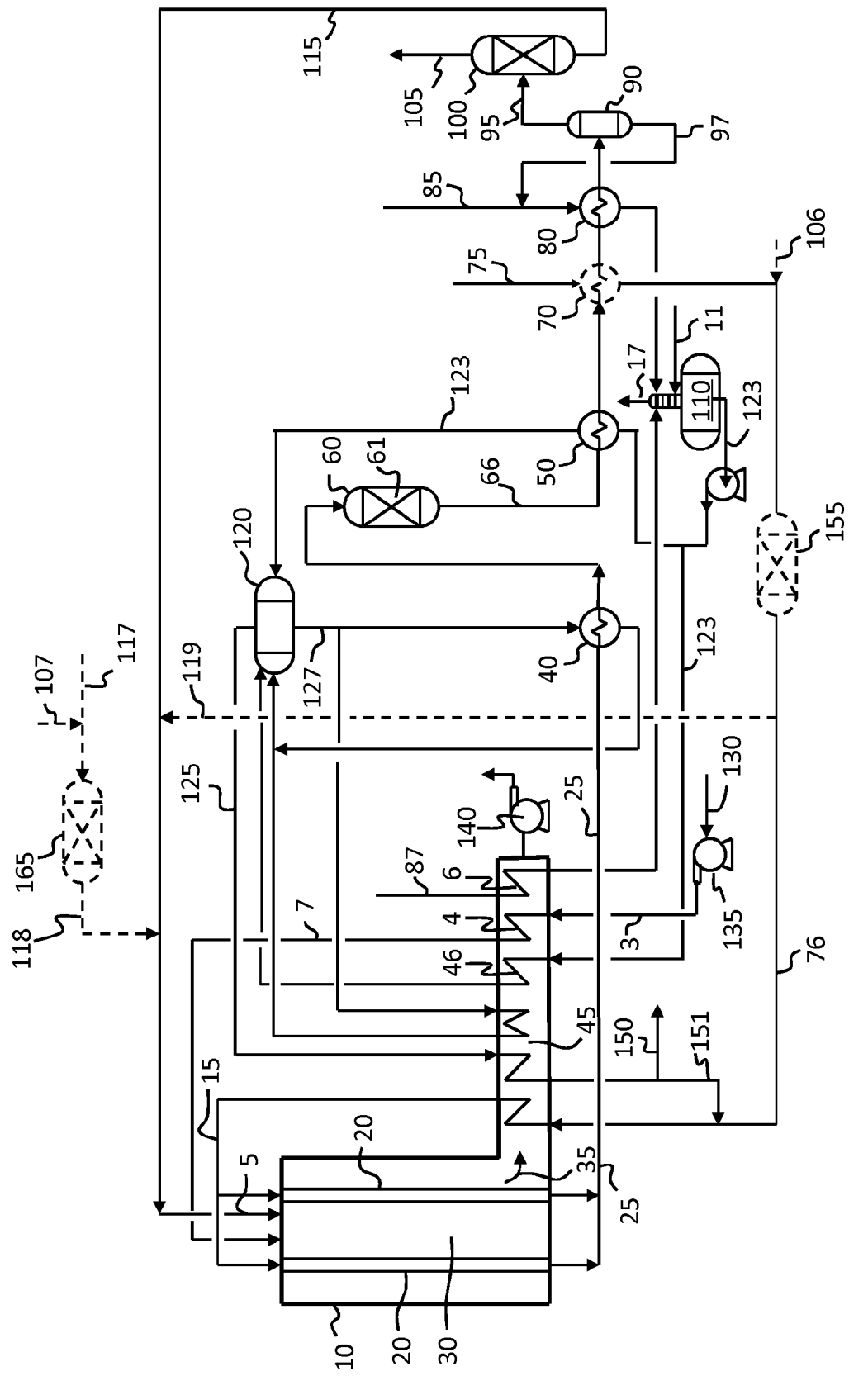
FIG. 1 is a process flow diagram for a steam-hydrocarbon reforming process according to the present process.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity means one of (1) the first entity, (2) the second entity, and (3) the first entity and the second entity.

The term "and/or" placed between the last two entities of a list of 3 or more entities means at least one of the entities in the list.

The term "plurality" means two or more unless explicitly recited to require more than two, for example, "a plurality of three or more" which means three or more.

The phrase "at least a portion" means "a portion or all." The at least a portion of a stream may have the same composition as the stream from which it is derived. The at least a portion of a stream may have a different composition to that of the stream from which it is derived. The at least a portion of a stream may include specific components of the stream from which it is derived.

As used herein a "divided portion" of a stream is a portion having the same chemical composition as the stream from which it was taken.

As used herein, "first," "second," "third," etc. are used to distinguish from among a plurality of features and/or steps and does not indicate the relative position in time or space.

Downstream and upstream refer to the intended flow direction of the process fluid transferred. If the intended flow direction of the process fluid is from the first device to the second device, the second device is in downstream fluid flow communication of the first device.

The term "depleted" means having a lesser mole % concentration of the indicated component than the original stream from which it was formed. "Depleted" does not mean that the stream is completely lacking the indicated component.

As used herein, "heat" and "heating" may include both sensible and latent heat and heating.

As used herein, the units for pressure are absolute pressure, not gauge pressure, unless specifically stated to be gauge pressure.

As used herein, "reformate" or "a reformate stream" is any stream comprising hydrogen and carbon monoxide formed from the reforming reaction of a hydrocarbon and steam.

As used herein, "indirect heat transfer" is heat transfer from one stream to another stream where the streams are not mixed together. Indirect heat transfer includes, for example, transfer of heat from a first fluid to a second fluid in a heat exchanger where the fluids are separated by plates or tubes. Indirect heat transfer includes transfer of heat from a first fluid to a second fluid where an intermediate working fluid is used to carry the heat from the first fluid to the second fluid. The first fluid may evaporate a working fluid, e.g. water to steam, in an evaporator, the working fluid passed to another heat exchanger or condenser, where the working fluid transfers heat to the second fluid. Indirect heat transfer from the first fluid to a second fluid using a working fluid may be accommodated using a heat pipe, thermosyphon, kettle boiler or the like.

As used herein, "direct heat transfer" is heat transfer from one stream to another stream where the streams are intimately mixed together. Direct heat transfer includes, for example, humidification where water is sprayed directly into a hot air stream and the heat from the air evaporates the water.

In the claims, letters may be used to identify claimed process steps (e.g., (a), (b), (c), (d), etc.). These letters are used to aid in referring to the process steps and are not intended to indicate the order in which claimed steps are performed, unless and only to the extent that such order is specifically recited in the claims.

The present invention relates to a process for producing a hydrogen-containing product (e.g. hydrogen or synthesis gas) and a steam product (i.e. export steam). The $H_2$-containing product may be, for example, a purified $H_2$ product gas or a synthesis gas product having a desired $H_2$:CO molar ratio.

The process is described with reference to the drawings, wherein like reference numbers refer to like elements throughout the drawings. In addition, reference numerals that are introduced in the specification in association with a drawing figure may be repeated in one or more subsequent figures without additional description in the specification in order to provide context for other features.

The process utilizes catalytic steam-hydrocarbon reforming. Catalytic steam-hydrocarbon reforming, also called steam methane reforming (SMR), catalytic steam reforming, or steam reforming, is defined as any process used to convert reformer feedstock into reformate by reaction with steam over a catalyst. Reformate, also called synthesis gas, or simply syngas, as used herein is any mixture comprising hydrogen and carbon monoxide. The reforming reaction is an endothermic reaction and may be described generally as $C_nH_m + nH_2O \rightarrow nCO + (m/2+n)H_2$. Hydrogen is generated when reformate is generated.

Figure 2:
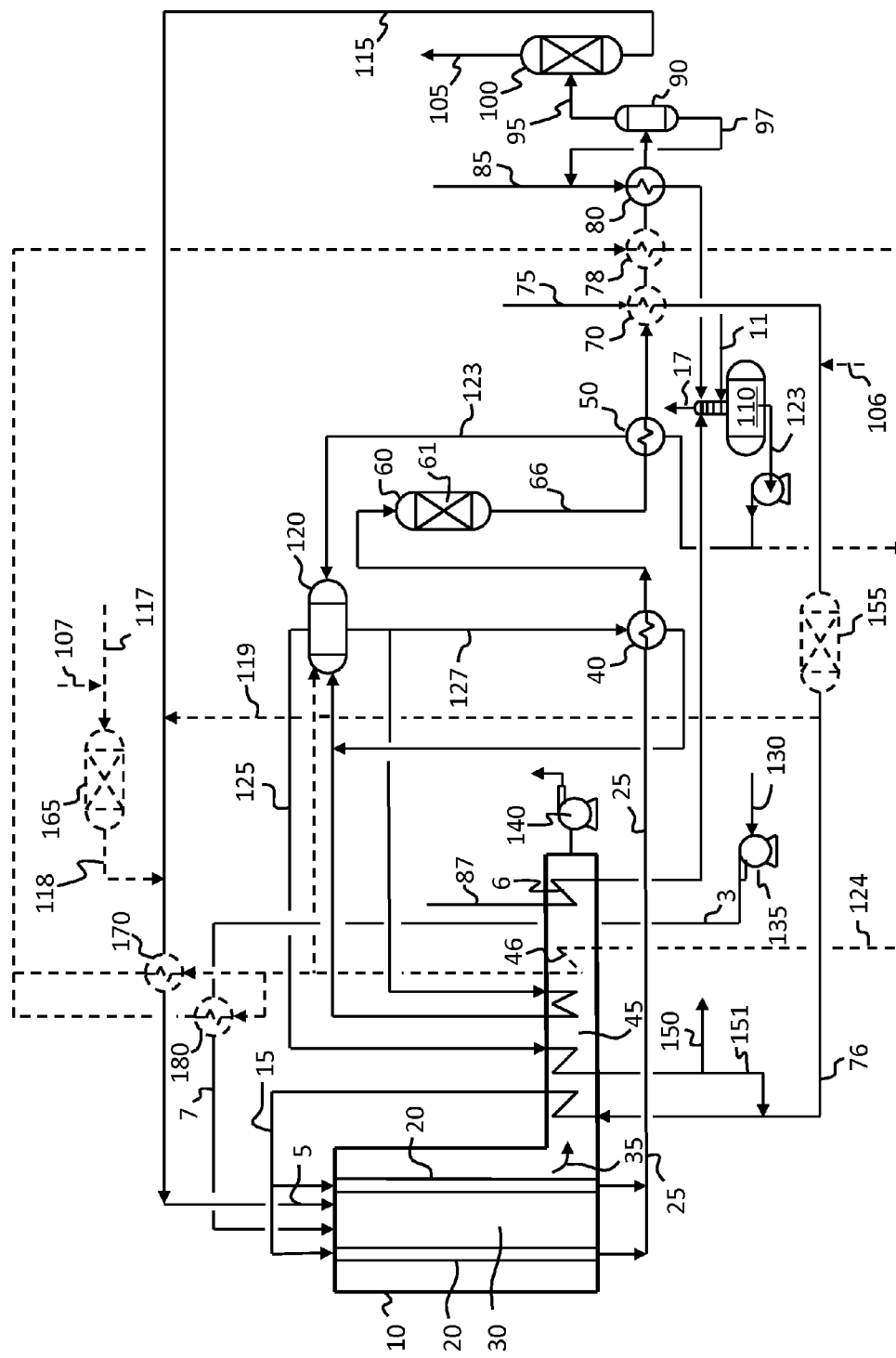
FIG. 2 is a process flow diagram for a steam-hydrocarbon reforming process according to the present process including a circulating water loop for extracting heat from the reformate and the combustion product gas to heat the oxidant gas (combustion air) and/or the fuel for combustion in the reformer furnace.

FIG. 1 and FIG. 2 are process flow diagrams for a catalytic steam-hydrocarbon reforming process suitable for carrying out the present process.

The process comprises introducing a reformer feed gas mixture 15 into a plurality of catalyst-containing reformer tubes 20 in a reformer furnace 10, reacting the reformer feed gas mixture 15 in a reforming reaction under reaction conditions effective to form a reformate 25 comprising $H_2$, CO, $CH_4$, and $H_2O$, and withdrawing the reformate 25 from the plurality of catalyst-containing tubes 20 of the reformer furnace 10.

The reformer feed gas mixture 15 may be any feed gas mixture suitable for introducing into a catalytic steam-hydrocarbon reformer for forming a reformate. The reformer feed gas mixture 15 may comprise a hydrocarbon feedstock 75 that has been desulphurized and steam 151, and/or a mixture of preformed hydrocarbon feedstock and steam. Hydrocarbon feedstock may be preformed with steam in an adiabatic prereformer (not shown) or convectively heated prereformer (not shown) to form preformed hydrocarbon feedstock. Feedstock may be natural gas, methane, naphtha, propane, refinery fuel gas, refinery off-gas, or other suitable reformer feedstock known in the art.

The reforming reaction takes place in the plurality of catalyst-containing reformer tubes 20 in reformer furnace 10. A reformer furnace, also called a catalytic steam reformer, steam methane reformer, and steam-hydrocarbon reformer, is defined herein as any fired furnace used to convert feedstock containing elemental hydrogen and carbon to reformate by a reaction with steam over a catalyst with heat provided by combustion of a fuel.

Reformer furnaces with a plurality of catalyst-containing reformer tubes, i.e. tubular reformers, are well known in the art. Any suitable number of catalyst-containing reformer tubes may be used. Suitable materials and methods of construction are known. Catalyst in the catalyst-containing reformer tubes may be any suitable catalyst known in the art, for example, a supported catalyst comprising nickel.

The reaction conditions effective to form the reformate 25 in the plurality of catalyst-containing reformer tubes 20 may comprise a temperature ranging from 500° C. to 1000° C. and a pressure ranging from 203 kPa to 5,066 kPa (absolute). The reaction condition temperature may be as measured by any suitable temperature sensor, for example a type J thermocouple. The reaction condition pressure may be as measured by any suitable pressure sensor known in the art, for example a pressure gauge as available from Mensor.

The process comprises combusting a fuel 5 with a heated oxidant gas 7 in a combustion section 30 of the reformer furnace 10 external to the plurality of catalyst-containing reformer tubes 20 under conditions effective to combust the fuel 5 to form a combustion product gas 35 and generate heat to supply energy for reacting the reformer feed gas mixture 15 inside the plurality of catalyst-containing reformer tubes 20. The combustion product gas 35 is withdrawn from the combustion section 30 of the reformer furnace and passed to the convection section 45 of the reformer furnace to supply heat to other process streams. The combustion section (also called the radiant, radiation, or radiative section) of the reformer furnace is that part of the reformer furnace containing the plurality of catalyst-containing reformer tubes. The convection section of the reformer furnace is that part of the reformer furnace containing heat exchangers other than the plurality of catalyst-containing reformer tubes. The heat exchangers in the convection section may be for heating process fluids other than reformate, such as for water/steam, air, by-product gas, reformer feed gas prior to introduction into the catalyst-containing reformer tubes, etc.

Conditions effective to combust the fuel may comprise a temperature ranging from 600° C. to 1500° C. and a pressure ranging from 99 kPa to 101.4 kPa (absolute). The temperature may be as measured by a thermocouple, an optical pyrometer, or any other calibrated temperature measurement device known in the art for measuring furnace temperatures. The pressure may be as measured by any suitable pressure sensor known in the art, for example a pressure gauge as available from Mensor.

The fuel 5 may comprise a by-product gas 115 from a pressure swing adsorber 100 and a supplemental fuel 118; 119 often called trim fuel. The by-product gas 115 may be heated before being used as fuel 5. The by-product gas 115 may be heated by indirect heat transfer with the combustion products gas and/or the reformate. The by-product gas 115 may be heated to a temperature ranging from 100° C. to 260° C.

Supplemental fuel (trim fuel) generally contains sulfur that converts to $SO_3$ in the combustion product gas upon combustion. $SO_3$ will condense and corrode the heat recovery equipment when the combustion product gas temperature has a temperature less than about 121° C.

In the present process, the sulfur may be removed from the supplemental fuel using hydrodesulphurization unit 155 and/or hydrodesulphurization unit 165. Alternatively the heat recovery equipment may be replaced regularly (i.e. using sacrificial heat exchangers) and/or corrosion resistant materials may be used in the construction of the heat exchange equipment.

As illustrated in FIGS. 1 and 2, the process may comprise introducing a hydrocarbon feedstock 117 along with hydrogen 107 into a hydrodesulphurization unit 165 to remove sulfur from the hydrocarbon feedstock thereby forming the supplemental fuel 118. Hydrogen 107 for hydrodesulphurization may be added to the feedstock before or after heating the hydrocarbon feedstock 75. Hydrogen product 105 may be used to provide hydrogen 107. Alternatively, or in addition, the process may comprise introducing a hydrocarbon feedstock 75 along with hydrogen 106 into a hydrodesulphurization unit 155 to remove sulfur from the hydrocarbon feedstock for forming the reformer feed gas mixture 15 from a first portion and the supplemental fuel 119 from a second portion. Hydrogen 106 for hydrodesulphurization may be added to the feedstock before or after heating the hydrocarbon feedstock 75. Hydrogen product 105 may be used to provide hydrogen 106. The hydrocarbon feedstock 117 may be from the same source or a different source than the hydrocarbon feedstock 75.

As illustrated in FIG. 2, heating the by-product gas 115 by indirect heat transfer with the combustion product gas 35 encompasses heating a working fluid (e.g. water) by indirect heat transfer with the combustion product gas 35 in heat exchanger 46 and heating the by-product gas 115 by indirect heat transfer with the heated working fluid in heat exchanger 170. Heating the by-product gas by indirect heat transfer with the reformate 25 encompasses heating a working fluid (e.g. water) by indirect heat transfer with the reformate 25 in heat exchanger 78 and heating the by-product gas by indirect heat transfer with the heated working fluid in heat exchanger 170. Heat may be extracted from the combustion product gas 35 and/or the reformate 25. The reformate and/or the combustion product gas may be used to heat water which is used to heat the by-product gas. The water may be heated to a temperature ranging from 100° C. to 270° C. The hot water may be boiler feed water withdrawn from the boiler feed water network. The hot water may be hot water from a separate closed loop of circulating water/steam.

As illustrated in FIG. 2, a portion of the boiler feed water 123 may be passed to a loop of circulating water/steam. The water in the loop may be passed to heat exchanger 46 to be heated by combustion product gas 35. A portion of the heated water may be passed to steam drum 120 and another portion of the circulating water may heat one or both of the by-product gas 115 in heat exchanger 170 and the oxidant gas 3 in heat exchanger 180. The circulating water may then be passed to heat exchanger 78 to be heated by the reformate 25.

The process comprises heating an oxidant gas 3 by indirect heat transfer with the combustion product gas 35 from the combustion section 30 thereby forming the heated oxidant gas 7 and cooling the combustion product gas 35. The oxidant gas 3 may be heated by indirect heat transfer with the combustion product gas 35 without the use of an intermediate working fluid as shown in FIG. 1, where the oxidant gas 3 and combustion product gas exchange heat in heat exchanger 4. Alternatively, the oxidant gas 3 may be heated by indirect heat exchange with the combustion product gas 35 using an intermediate working fluid (e.g. water) as shown in FIG. 2. The oxidant gas 3 may be heated to a temperature ranging from 100° C. to 260° C.

The oxidant gas 3 is a gas containing oxygen and may be air, oxygen-enriched air, oxygen-depleted air, industrial grade oxygen, or any other oxygen-containing gas known for use in a reformer furnace for combustion. For example, as shown in FIGS. 1 and 2, air 130 may be compressed in compressor 135, heated and passed to the reformer furnace as heated oxidant gas 7.

If the fuel and/or oxidant gas comprise nitrogen, the combustion product gas will also comprise nitrogen.

The process comprises heating a first water feed stream 87 by indirect heat transfer with the combustion product gas 35 thereby further cooling the combustion product gas. As shown in FIGS. 1 and 2, heat is extracted from the combustion product gas 35 to heat the oxidant gas 3 prior to extracting heat from the combustion product gas 35 to heat the first water feed stream 87. High level heat (higher temperature) is used to heat the oxidant gas and low level heat (lower temperature) is used to heat the first water feed stream 87.

The first water feed stream 87 provides a portion of what is typically called "make-up water" to the reforming process. The first water feed stream is water generally only in need of deaeration in order to be suitable as boiler feed water. The first water feed stream may be distilled water, treated water (decalcified, filtered, etc.) or other suitable water known in the art.

As shown in FIGS. 1 and 2, after heating various other process streams, the combustion product gas 35 exchanges heat with the first water feed stream 87 in heat exchanger 6. The first water feed stream 87 extracts low level heat from the combustion product gas 35. The first water feed stream 87 may be heated by the combustion product gas 35 to a temperature ranging from 65° C. to 125° C. The temperature of the first water feed stream may be as measured by any suitable temperature sensor, for example a type J thermocouple where the water passes over the sensing end of the thermocouple. The combustion product gas 35 may be cooled to a temperature ranging from 50° C. to 125° C. or ranging from 55° C. to 95° C. as a result of heating the first water feed stream 87. The temperature of the combustion product gas may be as measured by any suitable temperature sensor, for example a type J thermocouple where the combustion product gas passes over the sensing end of the thermocouple.

As shown in FIGS. 1 and 2, the combustion product gas 35 may heat a number of different process streams prior to heating the first water feed stream 87.

FIG. 1 shows the combustion product gas 35 heating the reformer feed gas mixture 15, followed by superheating the steam 125 from steam drum 120. A portion of the superheated steam may be used to form the reformer feed gas mixture 15 and another portion used to form a steam product 150 (i.e. export steam). The process comprises forming steam product 150 for export from at least a portion of the boiler feed water stream 123 withdrawn from the deaerator 110. The combustion product gas then heats a portion of boiler feed water 127 from steam drum 120 to form a two-phase mixture of steam and water of which at least a portion is returned to the steam drum 120. The combustion product gas then heats a portion of the boiler feed water 123 from the deaerator 110 in heat exchanger 46. The heated boiler feed water provides a portion of the make-up boiler feed water to the steam drum 120. The combustion product gas then heats combustion air 3 in heat exchanger 4 to form the heated oxidant gas 7 and finally the combustion product gas heats the first water feed stream 87 in heat exchanger 6. The combustion product gas may be drawn through the convection section by an induction fan 140.

FIG. 2 shows the combustion product gas 35 heating the reformer feed gas mixture 15, followed by superheating the steam 125 from steam drum 120. A portion of the superheated steam may be used to form the reformer feed gas mixture 15 and another portion used to form a steam product 150 (i.e. export steam). The process comprises forming steam product 150 for export from at least a portion of the boiler feed water stream 123 withdrawn from the deaerator 110. The combustion product gas then heats a portion of boiler feed water 127 from steam drum 120 to form a two-phase mixture of steam and water of which at least a portion is returned to the steam drum 120. The combustion product gas then heats a circulating water stream that heats combustion air 3 in heat exchanger 180 to form the heated oxidant gas 7 and fuel stream 5 in heat exchanger 170. Finally the combustion product gas heats the first water feed stream 87 in heat exchanger 6. The combustion product gas may be drawn through the convection section by an induction fan 140.

While specific embodiments are shown in FIGS. 1 and 2, prior to heating the first water feed stream 87, different configurations (order of heating and number of streams to be heated) may be applied as desired.

The process comprises heating a second water feed stream 85 by indirect heat transfer with the reformate 25 withdrawn from the plurality of catalyst-containing tubes 20, thereby cooling the reformate 25. The second water feed stream may be distilled water, treated water (decalcified, filtered, etc.) or other suitable water known in the art. As shown in FIGS. 1 and 2, after heating various other process streams and passing through an optional shift reactor 60 containing shift catalyst 61, the reformate 25 exchanges heat with the second water feed stream 85 in heat exchanger 80. The second water feed stream 85 extracts low level heat from the reformate 25. The second water feed stream 85 may be heated by the reformate 25 to a temperature ranging from 65° C. to 125° C. The temperature of the second water feed stream 85 may be as measured by any suitable temperature sensor, for example a type J thermocouple where the water passes over the sensing end of the thermocouple. The reformate 25 may be cooled to a temperature ranging from 25° C. to 150° C. as a result of heating the second water feed stream 85. The temperature of the reformate 25 may be as measured by any suitable temperature sensor, for example a type J thermocouple where the reformate passes over the sensing end of the thermocouple.

As shown in FIGS. 1 and 2, the reformate may exchange heat with a number of streams and may be passed to a shift reactor 60 containing shift catalyst 61. In the exemplary embodiments shown in FIGS. 1 and 2, the reformate 25 withdrawn from the plurality of catalyst-containing reformer tubes 20 is passed to heat exchanger 40 where the reformate 25 heats a portion of boiler feed water stream 127 thereby forming a two-phase water and steam stream that is reintroduced into steam drum 120. Steam 125 is withdrawn from the steam drum, and water is passed to any one of a number of heat exchangers to further heat the boiler feed water.

In the exemplary embodiments shown in FIGS. 1 and 2, the reformate 25 is passed from heat exchanger 40 to shift reactor 60. The process may comprise reacting the reformate 25 from heat exchanger 40 in the presence of a shift catalyst 61 under reaction conditions effective to form additional hydrogen in the reformate 25. Additional hydrogen gas may be obtained by the catalytic reaction of carbon monoxide and steam. This reaction is exothermic and is commonly referred to as the water-gas shift reaction or shift reaction: $CO+H_2O \rightarrow CO_2+H_2$. The reaction is affected by passing carbon monoxide and water through a bed of a suitable catalyst. The reaction conditions effective to form additional hydrogen in the reformate 25 may comprise a second temperature ranging from 190° C. to 500° C. and a second pressure ranging from 203 kPa to 5,066 kPa (absolute).

Any suitable shift catalyst may be used. The shift reactor may be a so-called high temperature shift (HTS), low temperature shift (LTS), medium temperature shift (MTS), or combination. Since the article "a" means "one or more," one or more shift reactors may be used in the process. Additional heat exchangers may be used as is known in the art.

For high temperature shift, an inlet temperature in the range 310° C. to 370° C., and an outlet temperature in the range 400° C. to 500° C. are typical. Usually an iron oxide/chromia catalyst is used for high temperature shift.

For low temperature shift, an inlet temperature in the range 190° C. to 230° C., and an outlet temperature in the range 220° C. to 250° C. are typical. Usually a catalyst comprising metallic copper, zinc oxide, and one or more other difficulty reducible oxides such as alumina or chromia is used for low temperature shift For medium temperature shift, an inlet temperature in the range 190° C. to 230° C. and an outlet temperature of up to 350° C. are typical. A suitably formulated supported copper catalyst can be used for medium temperature shift.

A combination may include a sequence of high temperature shift, cooling by indirect heat exchange, and low temperature shift. If desired, either shift stage can be subdivided with interbed cooling.

In the exemplary embodiment shown in FIG. 1, after passing through the shift reactor 60, the reformate 25 is passed to heat exchanger 50 where the reformate 25 heats a stream of boiler feed water 123 that is withdrawn from deaerator 110. The reformate 25 is then passed to heat exchanger 70 where hydrocarbon feedstock 75 is heated and reformate 25 is cooled. Reformate is then passed to heat exchanger 80 where the process step of heating the second water feed stream 85 by indirect heat transfer with at least a portion of the reformate 25 withdrawn from the plurality of catalyst-containing tubes 20 takes place, thereby cooling the reformate 25.

In the exemplary embodiment shown in FIG. 2, after passing through the shift reactor 60, the reformate 25 is passed to heat exchanger 70 where hydrocarbon feedstock 75 is heated and reformate 25 is cooled. Reformate 25 is then passed to heat exchanger 78 where the reformate heats a circulating water stream, which is used to heat fuel 5 in heat exchanger 170 and oxidant gas 3 in heat exchanger 180. Reformate is then passed to heat exchanger 80 where the process step of heating the second water feed stream 85 by indirect heat transfer with at least a portion of the reformate 25 withdrawn from the plurality of catalyst-containing tubes 20 takes place, thereby cooling the reformate 25.

After the reformate 25 is cooled by heat exchange with the second water feed stream 85, the reformate may be passed to a knock-out drum 90 and separated into a liquid water stream 97 and a water-depleted reformate portion 95. At least one of the first water feed stream 87 and the second water feed stream 85 may comprise the liquid water stream 97.

The present process is characterized by a water feed stream being heated by the combustion product gas 35 and another water feed stream being heated by the reformate 25. After being heated, the water feed streams are passed to a deaerator 110 where dissolved gases are removed.

The process further comprises passing the first water feed stream 87 and the second water feed stream 85 to a deaerator 110. The first water feed stream is passed to the deaerator 110 after being heated by the combustion product gas. The second water feed stream is passed to the deaerator 110 after being heated by the reformate 25. Dissolved gases are stripped from the first water feed stream 87 and from the second water feed stream 85 in the deaerator 110. Steam 11 may be introduced into the deaerator 110 or steam may be formed in-situ by heating or flashing. Steam aids in stripping the dissolved gases. Vent stream 17 is withdrawn from the deaerator 110, where the vent stream 17 comprises steam and gases formed from the dissolved gases stripped from the first water feed stream 87 and from the second water feed stream 6. Boiler feed water stream 123 is withdrawn from the deaerator 110. The boiler feed water stream 123 comprises at least a portion of the first water feed stream 87 and at least a portion of the second water feed stream 85. The boiler feed water stream may be pumped to a higher pressure, heated, and passed to steam drum 120.

The process further comprises forming the hydrogen-containing product 105 from the reformate 25 after the reformate 25 has heated the second water feed stream 85. The hydrogen-containing product 105 may be formed from at least a portion of the reformate 25. The hydrogen-containing product 105 may be formed from the water-depleted reformate portion 95.

The step of forming the hydrogen-containing product 105 may be done by cryogenic means, for example using a cold box to produce an oxogas having a desired $H_2$:CO molar ratio.

The step of forming the hydrogen-containing product 105 may comprise separating at least a portion of the reformate by pressure swing adsorption to produce the hydrogen-containing product 105 and a by-product gas 115. The reformate may be separated by pressure swing adsorption in pressure swing adsorber 100.

Separating a reformate to form a hydrogen-containing product (e.g. hydrogen) and a by-product gas by pressure swing adsorption is conventional and well-known. Suitable adsorbents and pressure swing adsorption cycles are known and may be selected. Any suitable number of pressure swing adsorption vessels may be selected and used.

The by-product gas 115 may be heated by indirect heat transfer with the combustion product gas. The by-product gas 115 may be heated by hot water from a boiler feed water circulating loop.

When high export steam production is desired, the sensible heat in the combustion product gas 35 may be used to enhance the efficiency of the catalytic steam-hydrocarbon reforming process. A "steam-to-hydrogen ratio" may be defined as the ratio of the mass flow rate of export steam 150, $m_{steam}$, to the mass flow rate of hydrogen-containing product 105, $m_{H2}$, where the hydrogen-containing product is at least 95 mole % hydrogen. High export steam production is defined herein as $$12 \le \frac{m_{steam}}{m_{H_2}} \le 25.$$

Conventional catalytic steam-hydrocarbon reforming processes heat all of the make-up water by exchanging heat with reformate as in the exemplary process flow diagram shown in FIG. 3. The make-up water is heated from ambient temperature up to a temperature suitable for introducing the make-up water into a deaerator (e.g. 65° C. to 125° C.) in heat exchanger 380. For the case of high export steam production, the low level heat in the reformate is not sufficient to heat the make-up water to the required temperature for deaeration. The higher level heat that would otherwise heat the boiler feed water in heat exchanger 350 has to be let down for low level heating of the make-up water in heat exchanger 380. This mismatch in heat source and heat sink results in combustion of additional fuel so that the lost duty in heat exchanger 350 for boiler feed water heating by reformate can be compensated in heat exchanger 446 by combustion product gas. The heat duty in heat exchanger 446 can be so large that there is little high level heat left for high level heating of oxidant gas 303 in heat exchanger 304. While the mismatch in heat source and heat sink causes the shortage of high level heat, the combustion of additional fuel causes a large amount of low level heat loss by the combustion product gas. Therefore, for the conventional catalytic-steam-hydrocarbon reforming process, the thermal efficiency deteriorates at steam-to-hydrogen ratios greater than about 12, since additional energy is required to heat the make-up water to the required temperature for deaeration.

The hydrogen-containing product 105 has a mass flow rate, $m_{H_2}$ and the steam product 150 exported from the process has a mass flow rate, $m_{steam}$. The reformer feed gas mixture 15 has a reformer feed gas mixture mass flow rate, the first water feed stream 87 has a first feed water feed stream mass flow rate, the second water feed stream 85 has a second water feed stream mass flow rate, the fuel 5 has a fuel mass flow rate, and the oxidant gas 3 has an oxidant gas mass flow rate. In the present process, the reformer feed gas mixture mass flow rate, the first water feed stream mass flow rate, the second water feed stream mass flow rate, the fuel mass flow rate, and the oxidant gas mass flow rate may be selected such that $$12 \le \frac{m_{steam}}{m_{H_2}} \le 25.$$

EXAMPLES

The following examples are used to illustrate the benefits of the present process. Aspen Plus® by Aspen Technology, Inc. was used to simulate the processes described in the examples. Typical conditions for commercial catalytic steam-hydrocarbon reforming are used, such as natural gas feedstock, a steam-to-carbon ratio of 2.8, and a reformate temperature leaving the catalyst-containing tubes of 870° C. Each example includes a high temperature shift reactor and does not include a prereformer.

Example 1

Comparative Case

The process flow diagram for example 1 is shown in FIG. 3.

Hydrocarbon feedstock 375 is heated by indirect heat exchange with reformate 325 in heat exchanger 370. Hydrogen 306 is added to the hydrocarbon feedstock 375 and passed to hydrodesulphurization unit 355. Desulfurized hydrocarbon feedstock 376 is blended with superheated steam 351 to form reformer feed gas mixture 315 which is heated by combustion product gas 335 in the convection section 345 of reformer furnace 310. Reformer feed gas mixture 315 is introduced into a plurality of catalyst-containing reformer tubes 320 in the reformer furnace 310 and reacted to form reformate 325 which is withdrawn from the catalyst-containing tubes 320 at a temperature of 870° C. as reformate 325.

Reformate 325 heats boiler feed water 427 from the steam drum 420 in heat exchanger 340 and is passed to shift reactor 360. The reformate is then passed to heat exchanger 350 to heat the boiler feed water from the deaerator 410. The reformate is then passed to heat exchanger 370 where it heats the hydrocarbon feedstock 375 and heat exchanger 380 where it heats make-up water 385. The reformate is further cooled and passed to knock-out drum 390 where condensate 397 is removed and water-depleted reformate 395 is removed.

The water-depleted reformate 395 is passed to pressure swing adsorber 400 to form hydrogen product gas 405 and by-product gas 415. Supplemental fuel 318 is added to by-product gas 415 to form fuel 305 which is combusted in the reformer furnace 10.

Fuel 305 is heated in heat exchanger 370 to a temperature of 220° C. Fuel 305 is combusted with heated air 307 in reformer furnace 10 to form combustion product gases 335. Air 430 is compressed in compressor 435, passed to heat exchanger 304 in the convection section 345 of the reformer furnace 310 to form heated air 307.

Combustion product gases 335 pass through heat exchanger sections to heat the reformer feed gas mixture, superheat steam from steam drum 420, heat boiler feed water which is recycled back to steam drum 420, heat the boiler feed water 423 from the deaerator 410 in heat exchanger 446, and preheat compressed air 303 in heat exchanger 304. Combustion product gases 335 are removed from the convection section via blower 440.

Boiler feed water 423 is circulated through a heat transfer loop to heat combustion air 303 in heat exchanger 380 and fuel 305 in heat exchanger 370. The boiler feed water is heated by reformate in heat exchanger 378 and further heated by combustion product gases 335 in heat exchanger 446.

Steam 425 which is removed from steam drum 420 is superheated in the convection section of the reformer furnace 310 to form export steam stream 450 and feed steam stream 351, the latter of which is blended with desulfurized feedstock to form the reformer feed gas mixture 315.

In example 1, the steam-to-hydrogen ratio is set to 11.2 corresponding to a case where the export steam production is below the limiting steam-to-hydrogen ratio. The steam-to-hydrogen ratio is based on the export steam stream 450 and the hydrogen product stream 405. In this example, the temperature of the reformate 383 after heating the make-up water 385 is 55° C., indicating that there is excess low level heat in the reformate.

In example 1, the combustion product gas leaving the convection section is constrained to be greater than 127° C., a temperature that will avoid sulfur corrosion per conventional steam-hydrocarbon reforming practice. The air was preheated to a temperature of 239° C.

The net energy consumption is defined as the total consumption of hydrocarbon feed and supplemental fuel minus the total enthalpy value of the export steam (referenced to water at 25° C.). The net energy consumption for example 1 is given a basis value of 100, from which the remaining examples are compared.

Example 2

Comparative Case

The process flow diagram for example 2 is the same as the process flow diagram for example 1, i.e. it is as shown in FIG. 3.

The difference in example 2 compared to example 1, is that the steam-to-hydrogen ratio is set to 16.3 corresponding to a case where the export steam production is greater than the limiting steam-to-hydrogen ratio. The steam-to-hydrogen ratio is based on the export steam stream 450 and the hydrogen product stream 405. In this example, the temperature of the reformate 383 after heating the make-up water 385 is 38° C., indicating that most of the low level heat in the reformate is used.

In example 2, the temperature of the combustion product gas leaving the convection section is constrained to be greater than 127° C., a temperature that will avoid sulfur corrosion per conventional steam-hydrocarbon reforming practice. Fuel 305 is heated in heat exchanger 370 to a temperature of 220° C. The air was preheated only to a temperature of 143° C., which is the highest allowed by the flow sheet at the steam-to-hydrogen ratio of 16.3, but still much lower than in example 1.

The net energy consumption for example 2 is 101.2, or 1.2% greater than in example 1, illustrating the degradation of the efficiency of the process when the steam-to-hydrogen ratio exceeds the limiting steam-to-hydrogen ratio.

Example 3

The process flow diagram for example 3 corresponds to that shown in FIG. 2 and includes the boiler feed water heating loop where fuel is heated in heat exchanger 170 and combustion air is heated in heat exchanger 180 by boiler feed water 124. Fuel 5 is heated in heat exchanger 370 to a temperature of 220° C. Boiler feed water 124 is heated by reformate in heat exchanger 78 and further heated by combustion product gases in heat exchanger 46.

The simulation is similar to that for examples 1 and 2, with the addition of a portion 87 of the make-up water being heated by the combustion product gases 35 in heat exchanger 6 to extract low level heat from the combustion product gas.

For a steam-to-hydrogen ratio of 17.3, the reformate temperature after heating the make-up water 85 is 38° C., indicating that most of the low level heat in the reformate is used.

In example 3, the temperature of the combustion product gas leaving the convection section is not constrained and was calculated to be 58° C., indicating that a great deal of the low level heat is recovered from the combustion product gas.

The air preheat temperature was calculated to be 233° C., similar to that of example 1.

The net energy consumption for example 3 is 99.3 or 0.7% less than base case example 1, thereby illustrating the energy efficiency benefit of the present invention.

We claim:

1. A process for producing a hydrogen-containing product and a steam product, the process comprising:
   (a) introducing a reformer feed gas mixture into a plurality of catalyst-containing reformer tubes in a reformer furnace, reacting the reformer feed gas mixture in a reforming reaction under reaction conditions effective to form a reformate comprising $H_2$, CO, $CH_4$, and $H_2O$, and withdrawing the reformate from the plurality of catalyst-containing tubes;
   (b) combusting a fuel with a heated oxidant gas in a combustion section of the reformer furnace external to the plurality of catalyst-containing reformer tubes under conditions effective to combust the fuel to form a combustion product gas and generate heat to supply energy for reacting the reformer feed gas mixture inside the plurality of catalyst-containing reformer tubes, and withdrawing the combustion product gas from the combustion section;
   (c) heating an oxidant gas by indirect heat transfer with the combustion product gas from the combustion section thereby forming the heated oxidant gas and cooling the combustion product gas;
   (d) heating a first water feed stream by indirect heat transfer with the combustion product gas thereby further cooling the combustion product gas, wherein heat is extracted from the combustion product gas to heat the oxidant gas prior to extracting heat from the combustion product gas to heat the first water feed stream;
   (e) heating a second water feed stream by indirect heat transfer with the reformate withdrawn from the plurality of catalyst-containing tubes;
   (f) passing the first water feed stream and the second water feed stream to a deaerator, the first water feed stream being passed to the deaerator after being heated by the combustion product gas, the second water feed stream being passed to the deaerator after being heated by the reformate, introducing steam into the deaerator or forming steam in-situ by heating or flashing, stripping dissolved gases from the first water feed stream and from the second water feed stream in the deaerator, withdrawing a vent stream from the deaerator, the vent stream comprising steam and gases formed from the dissolved gases stripped from the first water feed stream and from the second water feed stream, and withdrawing a boiler feed water stream from the deaerator, the boiler feed water stream comprising at least a portion of the first water feed stream and at least a portion of the second water feed stream;
   (g) forming the hydrogen-containing product from the reformate after the reformate has heated the second water feed stream; and
   (h) forming the steam product from at least a portion of the boiler feed water stream withdrawn from the deaerator.

2. The process of claim 1 wherein the hydrogen-containing product has a mass flow rate, $m_{H_2}$, the steam product exported from the process has a mass flow rate, $m_{steam}$, the reformer feed gas mixture has a reformer feed gas mixture mass flow rate, the first water feed stream has a first feed water stream mass flow rate, the second water feed stream has a second water feed stream mass flow rate, the fuel has a fuel mass flow rate, the oxidant gas has an oxidant gas mass flow rate, and wherein the reformer feed gas mixture mass flow rate, the first water feed stream mass flow rate, the second water feed stream mass flow rate, the fuel mass flow rate, and the oxidant gas mass flow rate are such that $$12 \leq \frac{m_{steam}}{m_{H_2}} \leq 25.$$

3. The process of claim 1 wherein the step of heating the oxidant gas by indirect heat transfer with the combustion product gas comprises:
   (c1) heating a first boiler feed water stream by indirect heat transfer with the combustion product gas;
   (c2) passing at least a portion of the first boiler feed water stream from step (c1) to a first heat exchanger; and
   (c3) heating the oxidant gas by indirect heat transfer with the at least a portion of the first boiler feed water stream in the first heat exchanger.

4. The process of claim 3 further comprising:
   passing the at least a portion of the first boiler feed water stream from the first heat exchanger to a third heat exchanger; and
   heating the at least a portion of the first boiler feed water stream by indirect heat transfer with the reformate in the third heat exchanger.

5. The process of claim 3 further comprising:
   passing at least another portion of the first boiler feed water stream from step (c1) to a second heat exchanger; and
   heating at least a portion of the fuel by indirect heat transfer with the at least another portion of the first boiler feed water stream in the second heat exchanger.

6. The process of claim 5 further comprising:
   passing the at least another portion of the first boiler feed water stream from the second heat exchanger to a third heat exchanger; and
   heating the at least another portion of the first boiler feed water stream by indirect heat transfer with the reformate in the third heat exchanger.

7. The process of claim 5 wherein the first boiler feed water stream heated in step (c1) is formed from a portion of the boiler feed water stream withdrawn from the deaerator and at least one of the at least a portion of the first boiler feed water stream from the third heat exchanger and the at least another portion of the first boiler feed water stream from the third heat exchanger.

8. The process of claim 3 further comprising:
   introducing a portion of the first boiler feed water stream from step (c1) into a steam drum.

9. The process of claim 1 wherein the oxidant gas is additionally heated by indirect heat transfer with the reformate.

10. The process of claim 1 wherein the oxidant gas is heated by the combustion product gas in step (c) to a temperature ranging from 100° C. to 260° C.

11. The process of claim 1 wherein the first water feed stream is heated by the combustion product gas in step (d) to a temperature ranging from 65° C. to 125° C.

12. The process of claim 1 wherein the combustion product gas is cooled to a temperature ranging from 50° C. to 125° C. as a result of heating the first water feed stream.

13. The process of claim 1 wherein the second water feed stream is heated by the reformate in step (e) to a temperature ranging from 65° C. to 125° C.

14. The process of claim 1 wherein the step of forming the hydrogen-containing product comprises separating at least a portion of the reformate by pressure swing adsorption to produce the hydrogen-containing product and a by-product gas.

15. The process of claim 14 wherein the fuel comprises the by-product gas and a supplemental fuel.

16. The process of claim 15 further comprising introducing a hydrocarbon feedstock into a hydrodesulphurization unit to remove sulfur from the hydrocarbon feedstock and forming the supplemental fuel from at least a portion of said hydrocarbon feedstock obtained from the hydrodesulphurization unit.

17. The process of claim 15 wherein at least a portion of the fuel is heated by indirect heat transfer with the combustion product gas and/or the reformate to a temperature ranging from 100° C. to 260° C.

\* \* \* \* \*